Figures 1, 4:
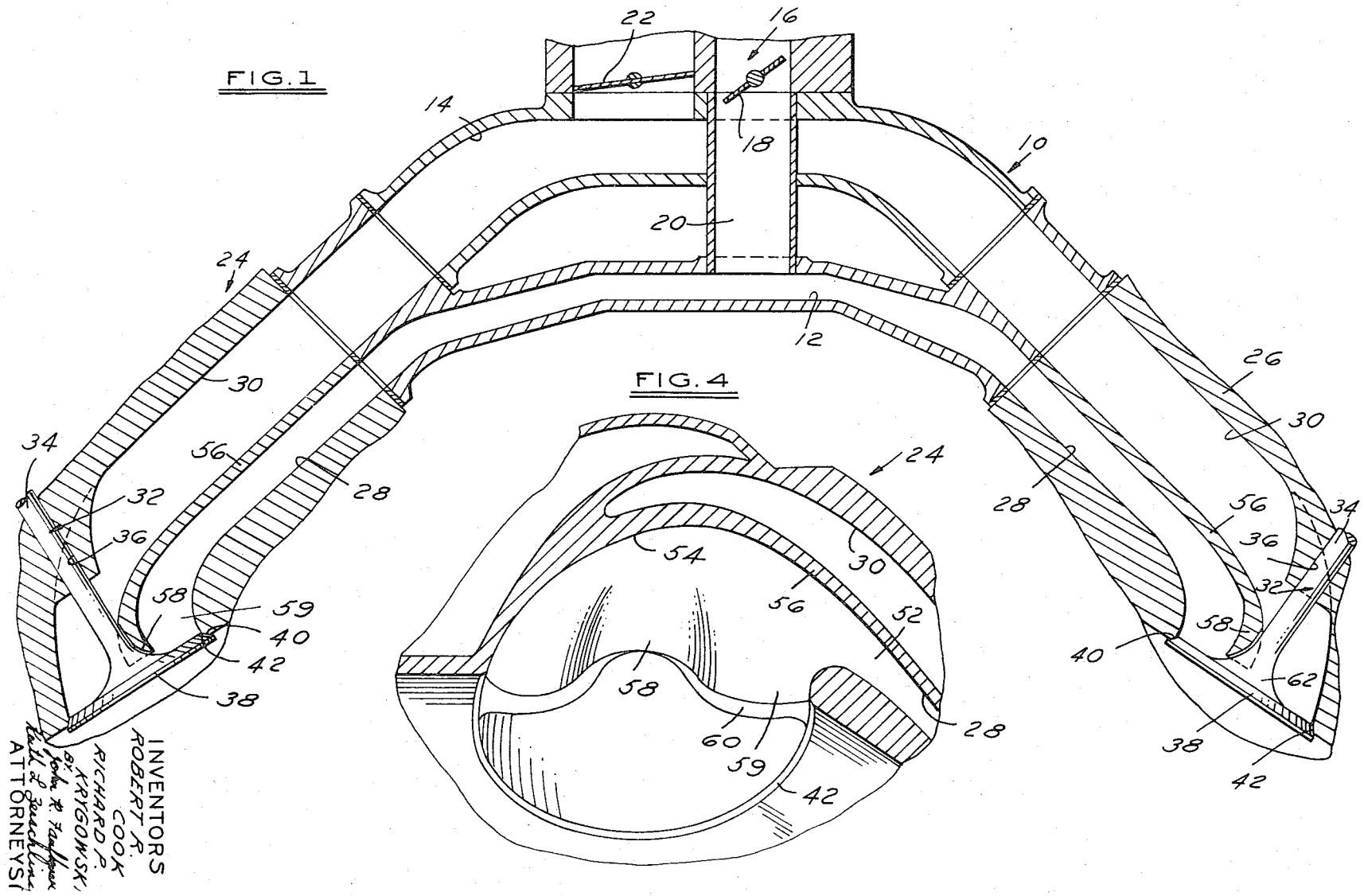
Figure 2:
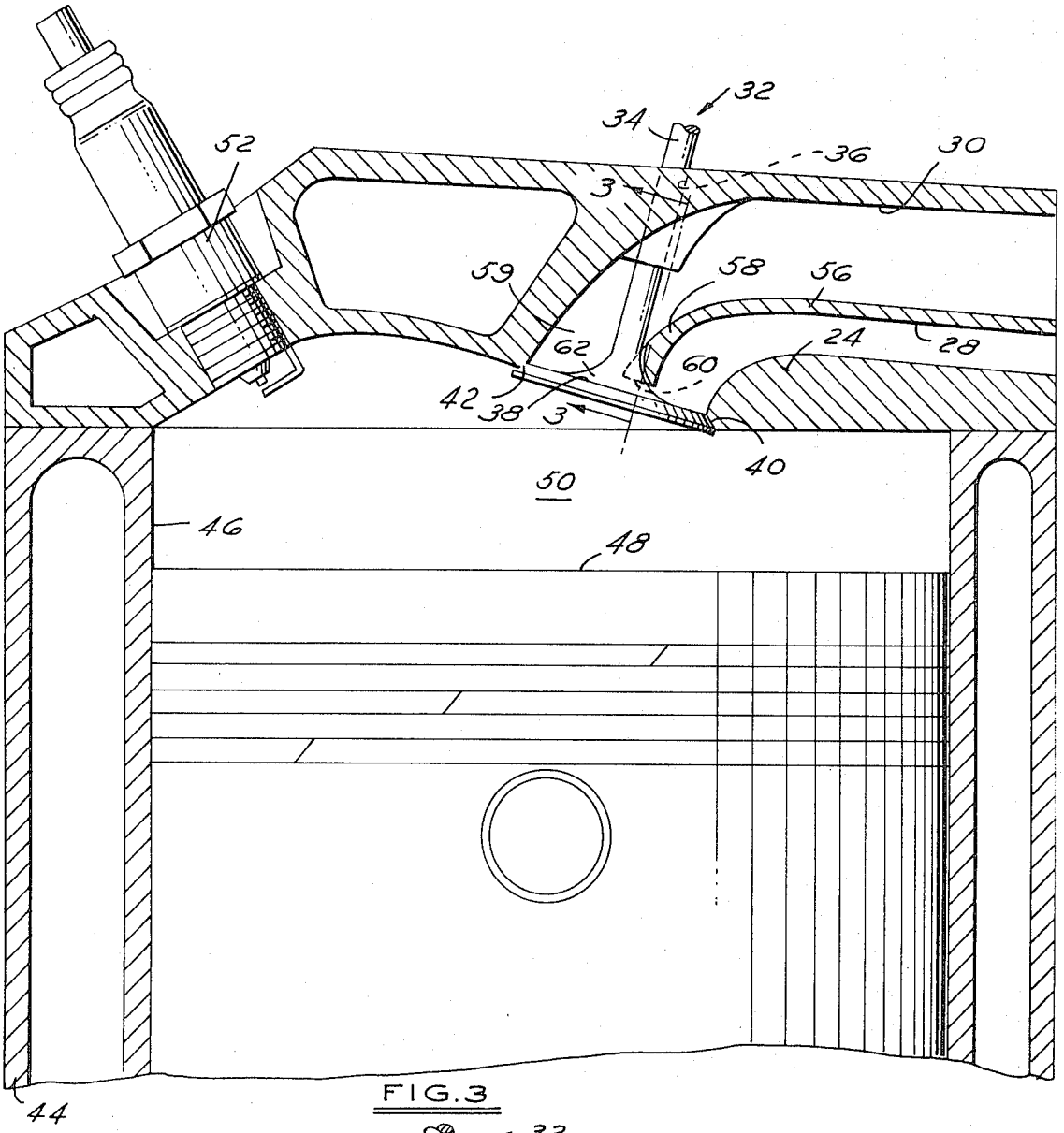
Figure 3:
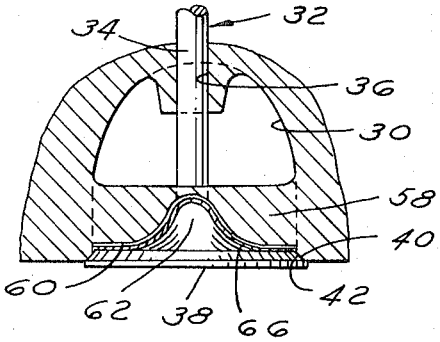

DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED OCTOBER 3, 1972

903 O.G. 8

T903,020

INTERNAL COMBUSTION ENGINE DUAL INDUCTION SYSTEM

Robert R. Cook, Dearborn, and Richard P. Krygowski, Livonia, Mich., assignors to Ford Motor Company, Dearborn, Mich.

Continuation of abandoned application Ser. No. 50,645, June 29, 1970. This application Jan. 7, 1972, Ser. No. 216,231

Int. Cl. F01l *3/00;* F02n *13/04*

U.S. Cl. 128—188 M

2 Sheets Drawing. 15 Pages Specification

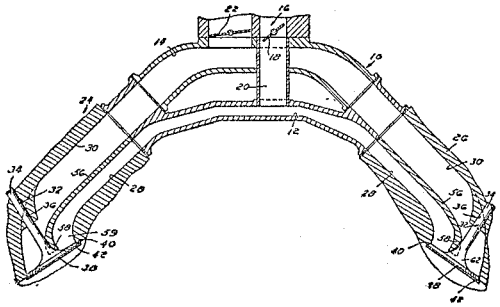

An internal combustion engine having a cylinder head positioned over the end of a combustion chamber with the cylinder head having primary and secondary induction passages positioned therein. An induction valve including a valve stem and a valve head is reciprocably mounted within the cylinder head, and a common wall of the primary and secondary induction passages terminates at the head of said valve in a web extending across the head. When the induction valve is in the closed position, the edge of this web is spaced from the valve head at a distance sufficiently small that the deposits on the valve head form a positive seal between the valve head and the edge of the web after the internal combustion engine has been operated for a short period of time. This structure provides a seal between the primary and secondary induction passages when the induction valve is closed.

INTERNAL COMBUSTION ENGINE DUAL INDUCTION SYSTEM

Original Filed June 29, 1970 2 Sheets-Sheet 1

INVENTORS
ROBERT R. COOK
RICHARD P. KRYGOWSKI
BY John R. Faulkner
Keith L. Zerschling
ATTORNEYS

INTERNAL COMBUSTION ENGINE DUAL INDUCTION SYSTEM

Original Filed June 29, 1970 2 Sheets-Sheet 2

INVENTORS
ROBERT R. COOK
RICHARD P. KRYGOWSKI
BY John R. Faulkner
Keith L. Zerschling
ATTORNEYS